Figure 1:
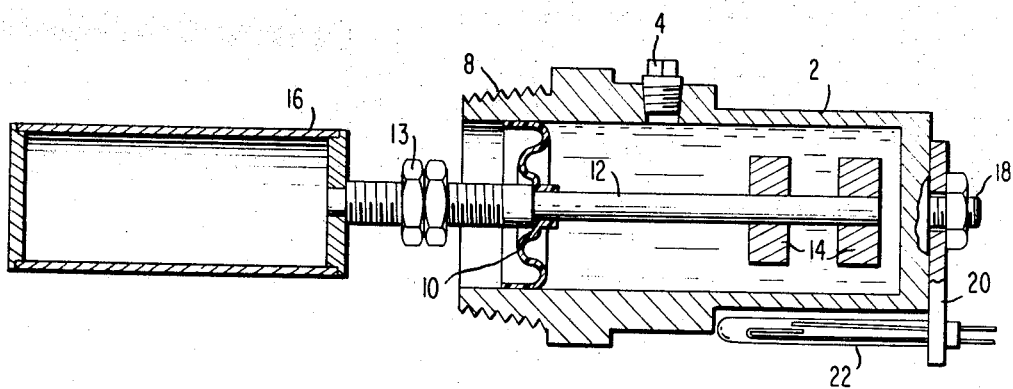

United States Patent
Akeley

[15] 3,702,910
[45] Nov. 14, 1972

[54] MAGNETIC FLOAT POINT SENSOR FOR HIGH PRESSURE CONTAINERS

[72] Inventor: Lloyd T. Akeley, Fullerton, Calif.

[73] Assignee: Simmonds Precision Products, Inc., Tarrytown, N.Y.

[22] Filed: March 24, 1971

[21] Appl. No.: 127,810

Related U.S. Application Data

[63] Continuation of Ser. No. 815,146, April 10, 1969, abandoned.

[52] U.S. Cl.................200/84 R, 200/84 B, 200/84 C
[51] Int. Cl.............................................H01h 35/18
[58] Field of Search....200/84 R, 84 B, 84 C; 73/308, 73/313

[56] References Cited

UNITED STATES PATENTS

| | | |
|---|---|---|
| 3,168,625 | 2/1965 | Hill.........................200/84 C |
| 2,204,161 | 6/1940 | Shepherd.................200/84 C |
| 2,116,415 | 5/1938 | Shenton...................200/84 R |
| 3,022,397 | 2/1962 | Goellner..................200/84 C |
| 2,587,747 | 3/1952 | McCullough.............200/84 B |
| 3,588,404 | 6/1971 | Akeley.....................200/84 C |
| 2,646,067 | 7/1953 | Smith.......................200/84 R |

Primary Examiner—David Smith, Jr.
Attorney—Edwin E. Greigg

[57] ABSTRACT

A float switch for operating a magnetic switch utilizing an oil-filled chamber in which there is supported for limited movement a magnetic member for energizing for a given position of the magnet a reed switch assembly mounted on the exterior of the chamber. A float member exterior of the housing and connected to the magnet by means of a bellows seal arrangement positions the magnet within the interior of the housing in accordance with the change of liquid level acting upon the float.

6 Claims, 2 Drawing Figures

PATENTED NOV 14 1972　　　　　　　　　　　3,702,910

INVENTORS
LLOYD T. AKELEY

BY *Edwin E. Greigg*
ATTORNEY

MAGNETIC FLOAT POINT SENSOR FOR HIGH PRESSURE CONTAINERS

This application is a continuation of Ser. No. 815,146, filed Apr. 10, 1969 now abandoned This invention relates to level sensing control switches, and more particularly to a float-actuated switch for use with a liquid container under relatively high pressure wherein installation is effected by means of a simple pipe thread mounting.

Where it is desirable to employ float-actuated switches in liquid containers, it is often the case that several such switches be employed for controlling exterior equipment responsive to different levels of the liquid within the container. As a consequence, it often becomes necessary to install such float switches within the container after the same has been constructed in response to new demands created by the system within which the container is used. For this purpose, it is desirable to install such switches externally of the container after the same has been installed and in operating condition and in many cases operating under high pressure conditions. Further, it is desirable that such switches be small in size, simple in construction and economical to manufacture, such that they can be replaced as a complete unit if necessary. Accordingly, the purpose of this invention is to provide such a switch which is easily installed and which can utilize a practical design for achieving high pressure capability as well as reliable operation.

It is an object of this invention to provide a float switch point sensor utilizing a float cooperating with a magnetic member within an oil-filled chamber for energizing a magnetic reed switch assembly mounted on the chamber.

It is another object of this invention to provide a float switch point sensor utilizing a float in cooperation with a mercury switch contained within an oil-filled chamber.

It is a further object of this invention to provide a point sensor float switch for use with a liquid container which can be easily installed through a simple pipe thread mounting.

It is yet another object of this invention to provide a dirt-resistant, high pressure point sensor for use in a liquid container which utilizes a float member in cooperation with a magnetic member contained within the chamber for actuating one or more adjustably mounted reed switches.

According to one aspect of this invention there is provided a hollow chamber closed at one end and having a pipe thread mounting at its other end for engaging a suitable aperture provided on the side wall of a liquid container. The chamber is oil-filled and is provided with a bellows seal member at its open end for supporting a rod having a float at one end exterior of the chamber and a magnetic member at the other end which is interior of the chamber. The bellows acts as a seal and pivotal diaphragm support at a point of balance on the rod member. A reed switch is positioned by means of an adjustable mount on the exterior face of the chamber such that the reed switch becomes activated by the magnetic field from the magnet when the latter positions itself at the bottom of the chamber. The reed switch can be rotatably adjusted to any position on the exterior surface of the chamber after the point sensor is installed.

Figure 2:
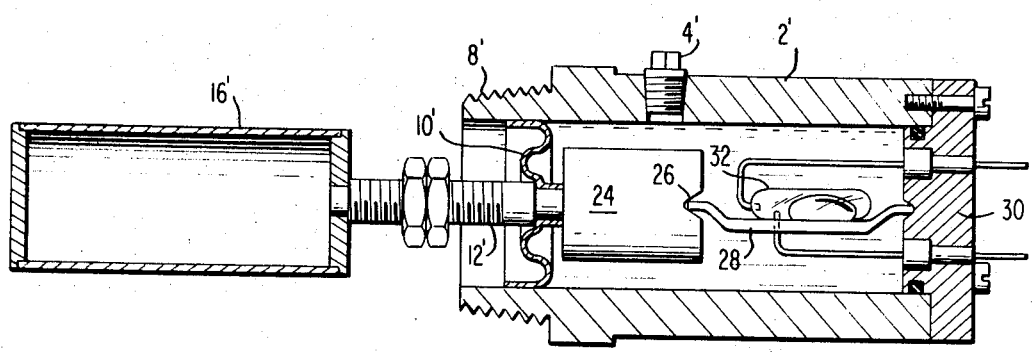

Other objects and advantages will become apparent from a study of the following specification and drawings, in which:

FIG. 1 is a side elevational view in section of the float switch constructed according to the principles of this invention; and FIG. 2 is a side elevational view in section of a modified float switch assembly in accordance with the principles of this invention.

Referring now to FIG. 1, there is shown a hollow chamber 2 which is filled with oil or other suitable viscous fluid having dielectric characteristics through a suitable fill plug 4. The chamber 2 has a threaded open end mounting 8 in which there is fitted a bellows seal diaphragm member 10. This member supports a rod 12 at its center of balance and that portion of the rod 12 which extends within the interior of the housing 2 is fitted with at least one cylindrical magnet member 14, although two are shown in the drawing. The other end of the rod 12 supports a hollow float member 16. The rod 12 has a portion thereof exterior of the chamber 2 provided with threads for adjustably supporting a counterweight member 13 for achieving a desired balanced condition between the magnets 14 and the float member 16. The closed end of the chamber 2 is provided with an extending screw thread member 18 which receives an apertured bracket member 20 which, in turn, supports a conventional magnetic reed switch assembly 22 on the exterior face of the chamber 2. It will be understood, of course, that the reed switch 22 becomes activated when under the influence of the magnetic field emanating from the magnets 14. This phenomenon occurs when the magnets 14 approach the vicinity of the switch 22 at the bottom of the chamber 2. As shown in FIG. 1, the magnetic reed switch assembly 22 can be rotated to any position on the exterior surface of the chamber 2 by merely rotating the bracket member 20 about the threaded stud 18. A suitable nut is secured to the stud 18 to clamp the bracket 20 in a desired given position.

The entire assembly may be screw-threaded into a drilled aperture in the wall of a suitable liquid container at any height by means of the pipe threaded fitting 8. After the chamber 2 has been secured to the wall of a liquid container, the reed switch assembly 22 may then be adjusted to occupy a position directly under the magnets 14 at the bottom of the housing 2, as shown in FIG. 1.

The magnets 14 are radially magnetized so that they influence the reed switch independent of the reed switch rotational position on the exterior surface of the chamber 2. As mentioned earlier, the switch position is adjustable so that it can be rotated to a desired top or bottom position, or for that matter, a number of switches can be employed in different circumferential positions, for example, two switches can be provided, one on the top and one on the bottom, after the pipe thread mounting has been completed. Because of the oil fill within the chamber 2, dirt or other particles that might be in the liquid operating the float 16 can be kept away from the magnets 14 as well as the electrical reed switch assembly 22. Also, the presence of fluid within the chamber 2 increases the pressure capability of the sensor itself by virtually removing any pressure drop across the pivot seal bellows member 10. This feature is an important one when the point sensor, according to this invention, is utilized under high pressure conditions. Also, the point sensor according to FIG. 1 will operate as a top mounted device as well as a side mounted device. For a top mounting, however, the arm 12 must be bent to approximately 90° at a point which is exterior to the chamber 2. In this arrangement the counterweight 13 may be dispensed with if so desired, wherein the weight of the float 16 will bias the magnets 14 against that part of the chamber 2 which is not in the vicinity of the reed switch assembly 22. When a change in liquid level causes the float to move, however, in this case in a clockwise direction about the seal 10, the magnets 14 will swing to the opposite interior wall of the chamber 2 in the vicinity of the reed switch assembly 22.

In operation, then, the float 16 will energize the reed switch assembly whenever the float is raised by a change in liquid level causing the rod 12 to pivot about the seal and and pivot diaphragm bellows 10 in a clockwise direction and thereby position the magnets 14 at the bottom of the chamber 2. with the magnets 14 in this position, the reed switch 22 will become energized under the influence of the magnetic field emanating from the magnets 14 in the known manner.

In FIG. 2 there is shown another embodiment of the point sensor according to this invention. When like elements between the FIG. 1 embodiment and FIG. 2 embodiment are described, the same reference numerals will be used but in this case they will be primed. As shown, a chamber 2' is filled with oil by means of the oil plug 4'. The chamber 2' has a threaded mount 8' at its open end and provided within the open end is the seal and pivotal diaphragm bellows member 10' which supports a rod 12', one end of which is exterior of the chamber 2' and supports the float member 16'. The portion of the rod 12' within the interior of the chamber 2' is provided with a counterweight 24 having an axially oriented notch 26 which receives the free end of a flexure strip member 28, the other end of the flexure member being embedded in the face plate or end wall 30 of the chamber 2'. Mounted on the flexure strip member 28 is a conventional mercury switch element 32 having appropriate electrical leads extending therefrom through the end plate 30. The free end of the flexure member 28 and the notch 26 of the counterweight 24, in effect, form a universal joint such that the rod 12' can pivot in any direction about the pivot diaphragm seal 10' in order to impart movement to the flexure member 28 and hence cause the mercury globule to move either forward or rearward for bridging the gap between the appropriate contacts in one of two positions.

The operation of the point sensor embodied in FIG. 2 is similar to that described with the embodiment shown in FIG. 1. It will be understood, however, that with a mercury switch the point sensor can only be used in a horizontal position unlike the point sensor described in FIG. 1. The mercury switch may be replaced after the point sensor is installed, and for this purpose the end face 30 is removed by unfastening suitable screws around the periphery of the plate 30. When the switch is replaced in this manner, however, the interior of the chamber 2' must be replenished with a new supply of oil. The end plate 30, of course, can be rotated after assembly in order to properly orient the magnetic switch 32 with respect to the housing 2'. Such rotation will be limited, however, by the number of symmetrical mounting screws provided.

It will be seen that the point sensor switching assemblies according to the concepts of this invention can be readily installed exteriorly of a liquid container by merely screwing the assembly into an aperture provided on the container. Also, it will be seen that the switch assembly can be constructed to extremely small dimensions allowing for desired savings in space and cost. The point sensor switching assembly according to this invention can be used in oil, water or other liquid storage tanks under high pressure to indicate high and low levels or to control the action of pumps used for filling or emptying a tank.

That which is claimed is:

1. A float switch assembly for a high pressure liquid container comprising a hollow chamber having an end wall and open to atmosphere at the other end and arranged to contain a dielectric fluid and further including a thick-walled, tough, flexible bellows seal member located interiorally thereof adjacent to said other end, a rod member extending through said seal member and supported thereby and having at one end thereof exterior to said housing a float member and at the other end thereof extending within the interior of said housing a magnetic member, said rod extending through said housing axially thereof when said float member is positioned above the liquid level of said high pressure container, weights adjustably mounted on said rod member to aid in balancing the same, and a magnetic reed switch responsive to said magnetic member and carried by a bracket secured to the exterior of said housing, said bracket being rotatable through an arc of 360° about the chamber so that it can be correlated into any position relative to the magnetic member.

2. A float switch assembly for a high pressure liquid container comprising a hollow chamber having an end wall and open to atmosphere at the other end and arranged to contain a dielectric fluid and further including a thick-walled, tough, flexible bellows seal located interiorally thereof adjacent to said open end, a stub rod member extending through said flexible seal member and supported thereby and including at the end exterior and adjacent to said housing a float member and on the other end extending within the interior of said housing a counterweight including a coupling means, said rod extending through said housing when said float member is positioned above the liquid level of said high pressure container, said counterweight adjustably mounted in coaxially adjustable position on said rod member to aid in balancing the same, a flexure member pivotally recessed between one end of the counterweight coupling means and said end wall of the chamber and mercury switch means carried by said flexure member.

3. A float switch assembly according to claim 1, in which the weight is axially adjustable relative to said rod member.

4. A float switch assembly as claimed in claim 2, wherein the mercury switch means include electrical leads extending through the end wall of the chamber.

5. A float switch assembly for a high pressure liquid container comprising a hollow chamber closed at an end by a flexible seal member and arranged to contain a dielectric fluid, a rod member extending through said seal member and supported thereby and having at one end thereof exterior to said housing a float member and at the other end thereof extending within the interior of said housing a magnetic member, a weight adjustably mounted on said rod member to aid in balancing the same, and a switch responsive to said magnetic member located exteriorly of said housing and carried by a bracket secured to the exterior of said housing, said bracket being adjustable circumferentially of said housing.

6. A float switch assembly for a high pressure liquid container comprising a hollow chamber closed at an end by a flexible seal member and arranged to contain a dielectric fluid, a rod member extending through said flexible seal member and supported thereby and having at one end exterior to said housing a float member and on the other end extending within the interior of said housing a counterweight including a coupling means, a flexure member pivotally recessed between one end of the counterweight coupling means and said end wall of the chamber and mercury switch means carried by said flexure member.

* * * * *